United States Patent [19]
Gahwiler

[11] 3,878,369
[45] Apr. 15, 1975

[54] METHOD AND APPARATUS FOR PRODUCING A MAGNITUDE PROPORTIONAL TO THE AVERAGE AMPLITUDE OF EVALUATED INPUT PULSES OF A MULTIPLICITY OF INPUT PULSES

[75] Inventor: Hermann Gahwiler, Zurich, Switzerland

[73] Assignee: Contraves AF, Zurich, Switzerland

[22] Filed: Sept. 12, 1972

[21] Appl. No.: 288,421

[30] Foreign Application Priority Data

Nov. 9, 1971 Switzerland .......... 16246/71

[52] U.S. Cl. ...... 235/92 PC; 235/92 PC; 235/92 PL; 235/92 PB

[51] Int. Cl. .......... G06m 11/64

[58] Field of Search ......... 235/92 PC, 92 PB, 92 PL

[56] References Cited

UNITED STATES PATENTS 3,127,505 3/1964 Gustauson .......... 235/92 PC
3,259,891 7/1966 Coulter .......... 235/92 PC
3,345,502 10/1967 Berg .......... 235/92 PC
3,579,249 5/1971 Dewey .......... 235/92 PB

*Primary Examiner*—Gareth D. Shaw
*Assistant Examiner*—Robert F. Gnuse
*Attorney, Agent, or Firm*—Werner W. Kleeman

[57] ABSTRACT

A method of, and apparatus for, producing a magnitude which is proportional to the average amplitude of a multiplicity of evaluated input pulses of a multiplicity of input pulses emanating from a pulse transmitter or generator at an irregular time interval and having different amplitude and width, while utilizing a peak amplitude storage with subsequently connected summation device. The invention contemplates evaluating and counting from all of the existing input pulses only such pulses, while summating their peak amplitudes, which with regard to their spacing in time or time interval from the preceding input pulse as well as with regard to their amplitude and width comply with or correspond to predetermined factors or evaluation standards or values.

6 Claims, 3 Drawing Figures

METHOD AND APPARATUS FOR PRODUCING A MAGNITUDE PROPORTIONAL TO THE AVERAGE AMPLITUDE OF EVALUATED INPUT PULSES OF A MULTIPLICITY OF INPUT PULSES

BACKGROUND OF THE INVENTION

The present invention relates to a new and improved method for producing a magnitude which is proportional to the average pulse peak height or amplitude of evaluated input pulses of a multiplicity of input pulses present at an irregular time interval or spacing from one another and having different pulse shapes, and also concerns a new and improved apparatus for carrying out the aforementioned method.

A particularly useful and primary field of application of this technique and the equipment used for the performance thereof is the determination of the average or means volume of the blood corpuscles or particles determined at a blood particle-evaluation device. There are known blood particle-evaluation devices, also known as blood cell counters or analyzers, wherein to both sides of a relatively short and narrow capillary path there is provided a respective compartment for an electrolytic blood thinning liquid and in each such compartment an electrode. If a constant direct-current is conducted through both electrodes and the intermediately situated fluid or liquid path which is narrowed by the capillary path and if at the same time a predetermined volume of liquid containing the blood particles in a certain dilution is driven through the capillary path from the one liquid compartment into the other, then during throughpassage of the blood particles through the capillary path there appear voltage pulses which clearly exceed the average direct-current voltage peak. These pulses can be filtered in known manner and counted. The peak amplitudes of such pulses are proportional to the volume of the blood particles causing such pulses during passage through the capillary path. Now since for comparing a blood picture of individual persons with standard blood pictures there is not only of significance the number of blood particles per unit quantity of blood but also the average volume of the blood particles is of extreme importance for diagnostic purposes, there is present a real need for techniques and devices for producing an objective measurement magnitude or value which is proportional to the average amplitude of the pulses obtained for instance from a blood particle-evaluation device or analyzer of the previously mentioned type and therefore proportional to the average or mean volume of the blood particles.

Now from U.S. Pat. No. 3,473,010 there is known such general type of technique and equipment. In that prior art system each input pulse with its peak amplitude is prolonged until there occurs the next following input pulse which again is prolonged by means of a peak amplitude storage until the next input pulse. During a predetermined integration time which positively encompasses a multiplicity of input pulses the thus obtained stepwise alternating voltage is integrated with the aid of a summation device, so that there is produced an output voltage proportional to the mean blood particle volume.

The voltage value determined with known apparatus according to the previously explained known method is, however, for the following reasons not sufficiently exactly proportional to mean blood particle volume.

apart from the input pulses generated by the blood particles there also occur from time to time pulses which, for instance, are caused by contaminants and possess an excessively great peak amplitude which is maintained until the arrival of a further pulse and therefore falsifies the measurement result.

also from time to time there arise narrow or small disturbance or defect pulses which are induced by electrical disturbances, the peak amplitude of which is maintained until the arrival of the next pulse.

furthermore, at the alternating-current coupled amplifier oscillations arise during rapid succession of pulses, and under the action of which the determined peak amplitudes of the rapidly successively following pulses appear to be less notwithstanding the fact that such are generated by similar type blood particles as the first pulse of the sequence.

SUMMARY OF THE INVENTION

Hence, from what has been stated above it should be recognized that this particular field of technology is still in need of a method of, and apparatus for, producing a magnitude proportional to the average pulse height or amplitude of a multiplicity of input pulses which is not associated with the aforementioned drawbacks and limitations of the prior art proposals. Hence, it is a primary object of the present invention to effectively and reliably fulfill the existing need in the art.

Another and more specific object of the present invention aims at improving upon the apparatus and method techniques heretofore proposed in the art and constituting the subject matter of this invention in a manner that by employing known criteria "proper," that is to say normal input pulses, it is possible with the hardware of the equipment to eliminate all non-normal input pulses, that is to say such non-normal input pulses will not be evaluated for the formation of an average value of the pulse peak amplitudes.

Still a further significant object of the present invention relates to an improved method of, and apparatus for, producing a magnitude which is reliably proportional to the average amplitude of a multiplicity of subsequently evaluated input pulses so as to obtain a more accurate particle analysis result.

Now in order to implement these and still further objects of the invention, which will become more readily apparent as the description proceeds, the inventive method for producing a magnitude which is proportional to the average amplitude or pulse peak height of a multiplicity of those subsequently evaluated input pulses of input pulses arriving from a pulse generator at an irregular time interval and with different amplitudes and width, while utilizing a peak amplitude storage with subsequently connected summation device, contemplates evaluating and counting from all of the arriving input pulses only such pulses, while summating their peak amplitudes, which with regard to their time interval or spacing from the preceding input pulse as well as with regard to their amplitude and width satisfy or correspond to a predetermined evaluation standard or criteria. In this regard only such input pulses are advantageously evaluated and counted which possess a minimum adjustable timewise spacing from the preceding arriving input pulse. Furthermore, in a more detailed aspect of the invention there is advantageously only evaluated such input pulses which exceed a preadjustable minimum amplitude, do not exceed a preadjustable maximum amplitude, exceed a preadjustable minimum width and do not occur during the evaluation time of the previously evaluated input pulse. In this regard measures can be undertaken to ensure that after counting and evaluating a preadjustable number of input pulses which are to be evaluated the further evaluation of input pulses is automatically interrupted, so that the summation value which has been obtained up to that point of the pulse peak amplitudes is proportional to the average pulse amplitude of all evaluated input pulses.

Not only is the invention concerned with the aforementioned method aspects but also deals with a new and improved construction of apparatus for the performance thereof which contemplates switching-in a signal controlled switching mechanism between a pulse input connected to the output of a pulse transmitter or generator and a pulse amplitude storage following which is connected a pulse amplitude- summation device. At the pulse input there is also connected a peak comparator which produces a logic signal during the time when each input pulse exceeds a preadjustable minimum amplitude. At the output of the aforementioned peak comparator there is connected the input of a time interval-measuring device which serves to generate at its output a trigger signal during each switch-in time of each signal from the peak comparator provided that since the last generated trigger signal there has elapsed a preadjustable minimum time duration. At the output of the time interval-measuring device there is connected a pulse displacement or shift mechanism for producing control pulses of predetermined duration and predetermined time displacement with regard to the trigger pulses. Additionally, there is provided a logic gate at the input of which there are connected the output signal of the peak comparator and the output of the pulse displacement mechanism and at the output of which there appears or is connected the switching signal for the controllable switching mechanism whenever there is present both the output signal from the peak comparator as well as also the control pulse.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
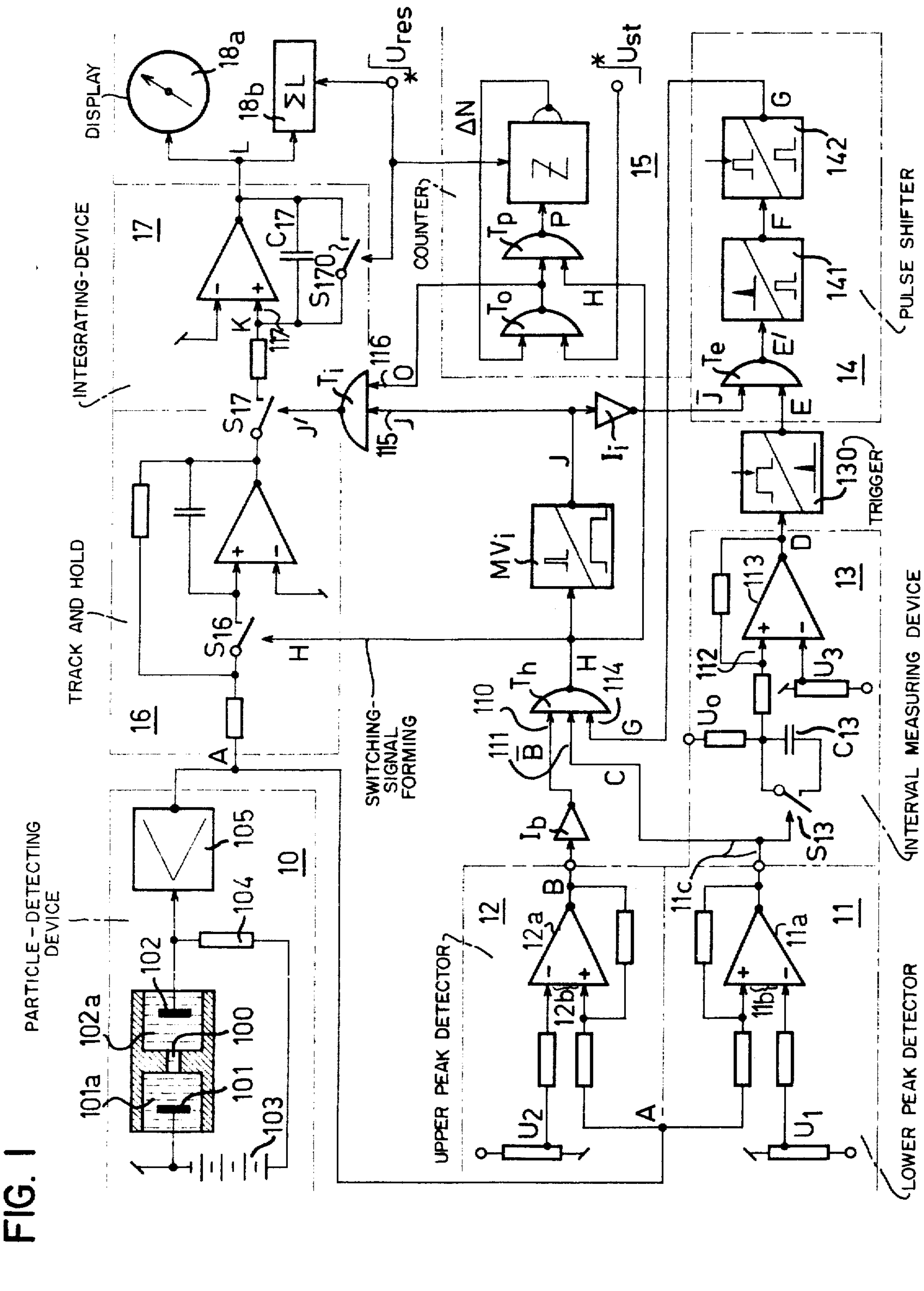
FIG. 1 is a block circuit diagram of an exemplary embodiment of apparatus for producing an output magnitude L proportional to the mean blood particle volume.

Describing now the drawings, in FIG. 1 there is schematically illustrated a blood corpuscle or particle counting device functioning as a pulse transmitter 10. Between the electrodes 101 and 102 which are each arranged in a respective fluid or liquid compartment 101*a* and 102*a* there exists a relatively short capillary connection or path 100. One pole of a direct-current voltage source 103 is connected with electrode 101. The other pole of this direct-current voltage source 103 is connected through the agency of a resistor 104 with the other electrode 102 and with the input of a pulse amplifier 105 in such a manner that a pulse sequence or train A of the type schematically depicted in FIG. 2 appears at the output of amplifier 105.

Figure 2:
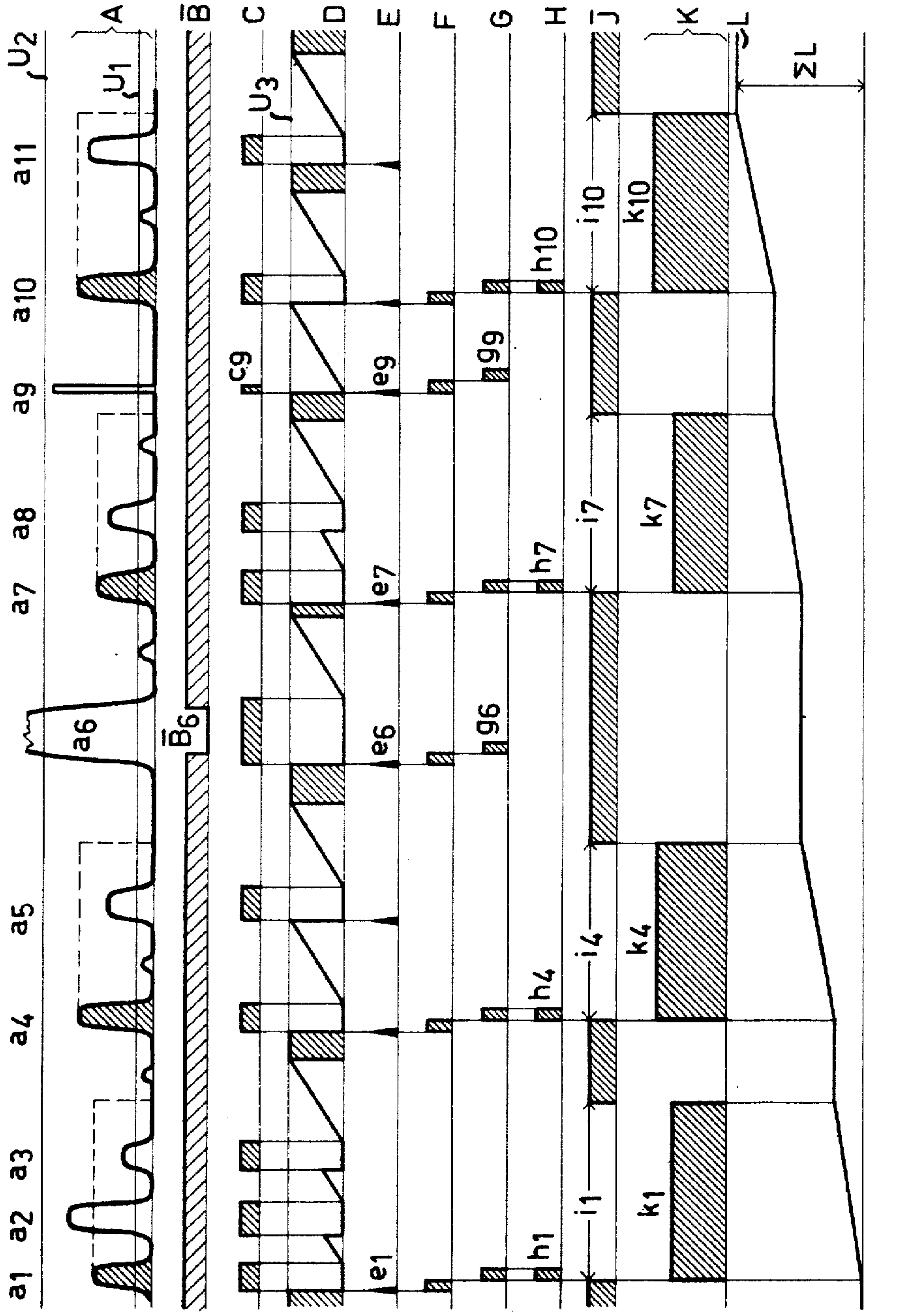
FIG. 2 illustrates graphs of the signals A to L shown in the circuit arrangement of FIG. 1 in association with common time values plotted along the abscissa of such graphs.

FIG. 2 is intended to illustrate that this pulse sequence encompasses "normal" or "standard" pulses $a_1$, $a_2$, $a_3$, $a_4$, $a_5$, $a_7$, $a_8$, $a_{10}$, $a_{11}$, of not too very different peak amplitudes and not too very different pulse widths. It is assumed that the aforementioned pulses are each brought about by the throughpassage of blood particles through the capillary path 100 of the pulse transmitter or generator 10. Other non-referenced pulses of the pulse sequence A do not exceed a lower peak value $U_1$ and are therefore not evaluated. Reference character $a_6$ represents an excessively large pulse which, for instance, is caused by a dirt particle instead of a blood cell particle. The abnormally narrow but relatively high pulse $a_9$ may have been induced for instance by an electrical defect or disturbance.

Now according to the showing of FIG. 1 the pulse sequence A is delivered to two peak comparators 11 and 12 which in known manner embody a respective amplifier stage 11*a* and 12*a* which a respective two inputs 11*b* and 12*b*. One of the inputs of each amplifier stage has delivered thereto the pulse sequence A as shown whereas at the other amplifier input of each such stage there are applied adjustable direct-current voltages $U_1$ and $U_2$ respectively, as also shown.

At the output 11c of the peak comparator 11 there appears a square wave signal C always during the time when a pulse of the pulse sequence A exceeds the minimum peak value $U_1$. Similarly during the time when a pulse of the sequence A exceeds the adjustable maximum peak value $U_2$ there appears a square wave signal B which following inversion in the inverter $I_b$ receives the form $\overline{B}$ illustrated in FIG. 2 and is applied to one input 110 of an AND-gate $T_b$. At the second input 111 of the AND-gate $T_b$ there appears the signal C. The signals C, however, according to the arrangement of FIG. 1, are also delivered to a time interval-measuring device 13 and in each case, during their period of effectiveness, close a switching mechanism $S_{13}$ which then short-circuits a capacitor $C_{13}$. Between two successive signals C the switch $S_{13}$ is opened, so that the capacitor $C_{13}$ is charged by a positive voltage source $U_0$ with a predetermined ascent or rise. The capacitor voltage is applied to the input 112 of a peak comparator 113 of the same construction as the peak comparators 11 and 12. It produces a binary signal D as soon as the voltage at the capacitor $C_{13}$ has reached a preadjustable value $U_3$. This then occurs when the time interval or spacing of two successive signals C and A respectively are larger than a predetermined minimum time interval or spacing due to adjustment of the voltage $U_3$. The possibly produced signals D decay synchronously with the rise or ascent of a subsequent signal C, and in this regard attention is invited to FIG. 2. With the aid of a trigger mechanism 130 there is produced during each decay of the signals D a trigger signal E. From FIG. 2 it will be noted that for the input signals $a_1$, $a_4$, $a_5$, $a_6$, $a_7$, $a_9$, $a_{10}$, $a_{11}$, there are produced trigger signals E because the signals $a_2$, $a_3$, and $a_8$ follow too rapidly the preceding input signals.

The trigger pulses or signals E, provided that the AND-gate $T_e$ is not blocked in a manner to be described more fully hereinafter, are applied as signals E' to a multivibrator 141 which in each case triggers a square wave signal F of, for instance, $10^{-5}$ seconds duration. The signals F upon decaying in a multivibrator 142 trigger a further respective square wave signal G of approximately the same duration. The signals G are designated as control signals and displaced or shifted with respect to the trigger signals E by the duration of the signals F. They each fall into the peak value region of the corresponding input pulse A, as best seen by referring to FIG. 2. The control signals G are delivered to a third input 114 of the AND-gate $T_b$ and trigger, to the extent that the gate $T_b$ is not blocked by the absence of the signal B and/or the signal C, synchronous switching signals H.

Now the switching signals H on the one hand serve to close switching mechanism $S_{16}$ at the input of pulse storage device 16 possessing a mode of operation which will be described more fully hereinafter. On the other hand, the switching signals H trigger at a time switching mechanism or summation pulse transmitter $MV_i$, for instance a multivibrator, summation signals J of considerably longer duration, for instance $10^{-3}$ seconds. These signals J, following inversion at the inverter $I_i$, bring about during their duration blocking of the aforesaid logic AND-gate $T_e$ and therefore blocking of the transmission of the trigger pulses E from the trigger mechanism 130 to the multivibrator 141 of the pulse displacement or shift mechanism 14. On the other hand, the signals J are delivered to input 115 of logic AND-gate $T_i$.

In FIG. 1 reference character 15 designates a counter mechanism or counter means. It contains a pulse counter Z which can be adjusted to a final or terminal count number N which is to be obtained, for instance to 10,000 evaluated input pulses. It produces at its output a positive signal $\Delta N$, as long as the number of counted pulses is smaller that the adjusted final or terminal count number N. This signal $\Delta N$ produces at the output of logic AND-gate $T_a$ a signal O provided that also a release signal $U_{st}$ possesses a corresponding release value. The signal O is delivered both to the input 116 of the AND-gate $T_i$ as the second input signal as well as also to logic AND-gate $T_p$ and during the period of duration of the signal O there are delivered from such gate $T_p$ the switching pulses H likewise delivered to such gate, in the form of counting signals P to the counter Z. As soon as the predetermined counter result or setting N has been reached the signal $\Delta N$ decays and therefore also the signal O. As a result, the gate $T_p$ is blocked for further transmission of switching pulses H and also the gate $T_i$ is blocked for further transmission of the timing pulses J and J' respectively to switch $S_{17}$.

The pulse peak amplitude-storage mechanism 16 is designed as a so-called conventional "track-hold" circuit. It encompasses the switch $S_{16}$ controlled by the switching signals H, so that from those input pulses A, at the central band of which coincide the switching pulses H (FIG. 2), there are stored the pulse peak amplitudes. During the duration of the timing pulses J, and provided that the signal O exists, the switch $S_{17}$ between the storage mechanism 16 and the summation or integrator device 17 is closed. Thus, during the duration of each signal J there is present at the input 117 of the summation or addition device 17 the signal K (FIG. 2), the amplitude of which is equal to the peak amplitude of the last stored input pulse A. As long as this storage voltage K appears at the summation device or integrator 17 the output voltage L at the capacitor $C_{17}$ increases with a slope or rise which is proportional to the constant height or amplitude of the signal K and remains at the attained value L after decay of the signal K. The voltage L at the output of the summation device or integrator 17 thus at any time corresponds to the sum of all peak amplitudes of the already evaluated input pulses A and can be either read-out at an analog indicating instrument $18_a$ or a digital indicator $18_b$.

After reaching the predetermined number N of evaluated input pulses A and switching pulses H and P respectively further evaluation of input pulses A is blocked and the then indicated value of the summation voltage L corresponds to the sum of the peak amplitudes of all evaluated input pulses A and is also proportional to the average pulse amplitude of all evaluated input pulses.

By switching over the voltage $U_{res}$ to a return or resetting value while simultaneously positioning at null the starting signal $U_{st}$ the switch $S_{170}$ is closed to short-circuit the capacitor $C_{17}$ while resetting the instruments $18_a$ and $18_b$ to null and the counter condition of the counter Z is reset back to null, so that the apparatus can again be placed into operation by switching-in the start signal $U_{st}$.

Continuing, FIG. 2 illustrates the time correlation of the input signals A to the aforeexplained signals $\overline{B}$, C, D, E, F, G, H, $\overline{J}$, K and L and indicates that only the input pulses $a_1$, $a_4$, $a_7$, $a_{10}$, are evaluated. They fulfill the following criteria:

they exceed the lower peak value $U_1$ (signal C)

they do not exceed the upper peak value $U_2$ (signal $\overline{B}$)

they extend at least over the duration of the pulses F (signals C + G)

they possess from the preceding input pulse A a time interval or spacing which at least corresponds to a minimum spacing or distance (trigger signal E) determined by adjustment of the voltage $U_3$.

they do not fall into the integration time of the last evaluated input pulse (signal $\overline{J}$)

Figure 3:
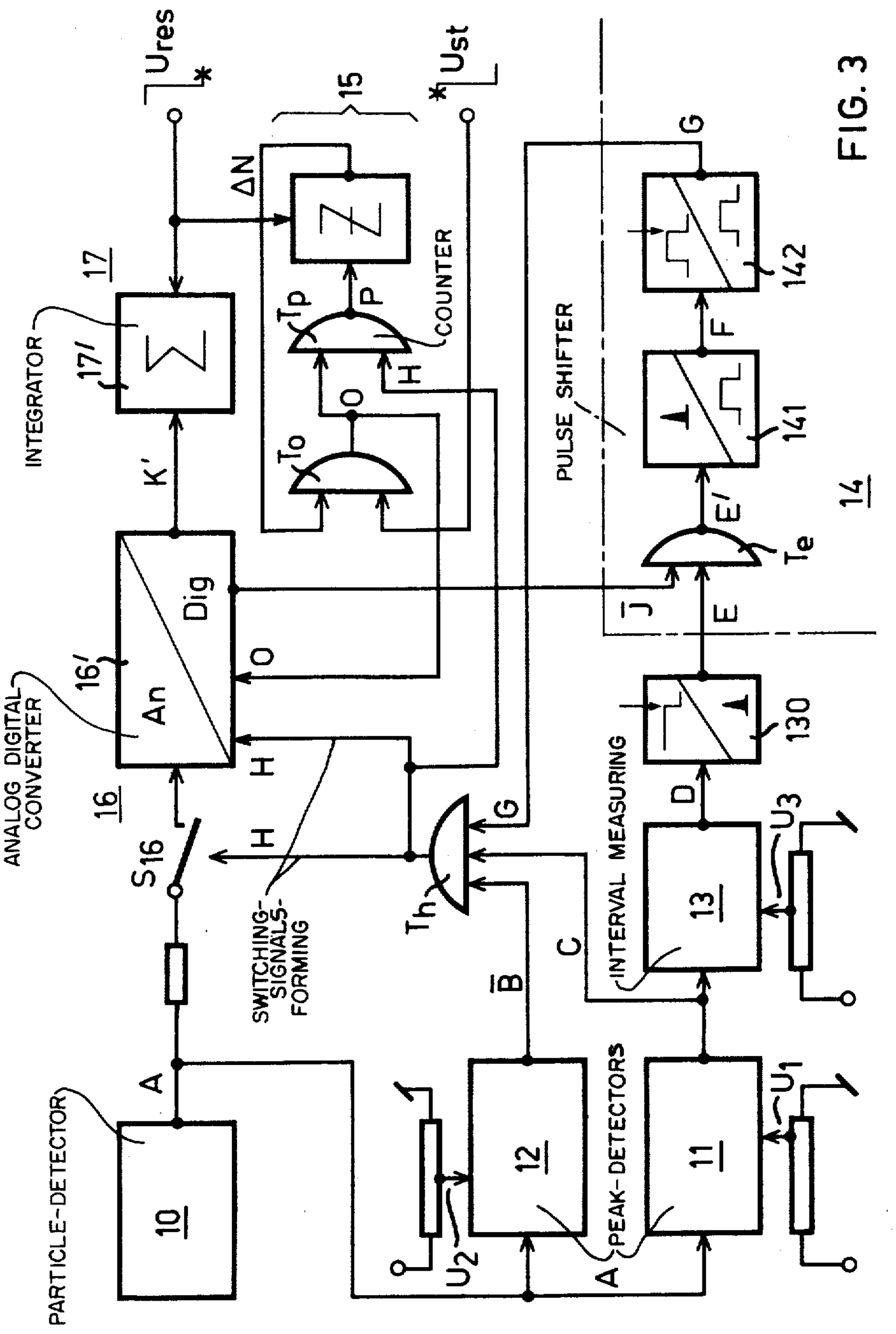
FIG. 3 is a block circuit diagram of a variant construction of apparatus from that shown in FIG. 1.

The modified version of apparatus depicted in FIG. 3 corresponds extensively to that of FIG. 1 so that corresponding or analogous components have been generally designated with the same reference characters.

This arrangement is only different as concerns the storage mechanism 16 and the summation mechanism 17. As the storage mechanism 16 there is employed a "track-hold" circuit with subsequently connected analog-digital converter 16', to which there is delivered the input pulses A to be evaluated during the duration of the switching signals H by means of the switch $S_{16}$. Thus, their pulse peak amplitudes are stored and converted into a corresponding digital value provided that the signal 0 is present. Each analog-digital conversion is triggered by a switching signal H. During the conversion time an output signal $\overline{J}$ blocks the AND-gate $T_e$ and therefore transmission of the trigger pulses E to the multivibrator 141. In summation mechanism 17' the pulse amplitude values K' of the evaluated input pulses A delivered by the analog-digital converter 16' are added to the signal L.

While there is shown and described present preferred embodiments of the invention, it is to be distinctly understood that the invention is not limited thereto but may be otherwise variously embodied and practiced within the scope of the following claims.

What is claimed is:

1. An apparatus for producing a magnitude proportional to the average pulse amplitude of evaluated input pulses of a multiplicity of input pulses, comprising particle detecting- pulse transmitter means including an output for generating the input pulses, pulse amplitude-storage means having a pulse input which is connected to the output of said pulse transmitter means, a pulse amplitude-summation device connected after said pulse amplitude-storage means, said pulse amplitude-storage means being provided with a signal-controlled switching mechanism connected between said pulse input and said pulse amplitude-storage means, a peak comparator having an input and output, said peak comparator having its input connected in circuit with said pulse input of said pulse amplitude-storage means, said peak comparator producing a logic signal at its output during the time when each input pulse received from said pulse transmitter means exceeds a pre-adjustable minimum amplitude, a time interval-measuring device including an input and an output, the input of said time interval-measuring device being in circuit with said output of said peak comparator, said time interval-measuring device serving to generate at its output a trigger pulse during the switch-in time of each logic signal received from said peak comparator provided that there has expired a pre-adjustable minimum duration since the last generated trigger pulse, a pulse displacement mechanism having an input and an output, the input of said pulse displacement mechanism being connected with the output of the time interval-measuring device for generating control pulses of predetermined duration and predetermined time displacement with respect to the trigger pulses, a first logic gate having a plurality of inputs and an output, one of said inputs being connected with the output of the peak comparator for receiving the output logic signal of said peak comparator, another of said inputs of said first logic gate being connected with the output of the pulse displacement mechanism for receiving output control pulses generated by said pulse displacement mechanism, the output of said first logic gate being in circuit with the signal-controlled switching mechanism for applying a switching signal to said signal-controlled switching mechanism during the presence of both a logic signal from the peak comparator and a control pulse from the pulse displacement mechanism.

2. The apparatus as defined in claim 1, further including a summation pulse transmitter connected with the output of the logic gate, a controllable switch means connected in circuit with the pulse amplitude-storage means and the pulse amplitude-summation device, a further logic gate in circuit with said pulse displacement mechanism, said summation pulse transmitter upon the presence of a switching signal pulse at the output of the first logic gate for the signal-controlled switching mechanism producing a summation pulse of predetermined duration which under the action of said controllable switch means triggers the addition of the mementarily stored pulse peak amplitudes to the previously attained summation value of all prior evaluated pulse amplitudes and via said further logic gate blocks the transmission of trigger pulses to the pulse displacement mechanism.

3. The apparatus as defined in claim 1, including a further logic gate connected in circuit with said pulse displacement mechanism said pulse amplitude-storage means comprising a storage with subsequently connected analog-digital converter for producing a signal which during the conversion time blocks via said further logic gate the transmission of trigger pulses to the pulse displacement mechanism.

4. The apparatus as defined in claim 1, further including a counter mechanism for the evaluated input pulses which counts each switching signal pulse at the output of the first logic gate for the signal-controlled switching mechanism of the pulse amplitude-storage means and after attaining a pre-adjusted count number produces a blocking signal, a further logic gate in circuit with said counting mechanism, said blocking signal through the agency of said further logic gate blocking the summation and counting of further input pulses.

5. The apparatus as defined in claim 1, further including a second peak comparator connected in circuit with said pulse transmitter means and which during the time when an input pulse signal exceeds a pre-adjustable maximum value produces a blocking signal serving as a third input signal to the logic gate, and during the effective duration of such input pulse blocks the transmission of a control signal from the pulse displacement mechanism which appears at the output of the first logic gate as a switching signal for the signal-controlled switching mechanism in circuit with the pulse amplitude-storage means.

6. A method for generating a signal whose magnitude corresponds substantially to the average cell volume of particles suspended in an electrically conductive liquid, which comprises the steps of:

driving said particle-containing liquid through a capillary restriction of a particle detecting device which includes an inlet electrode and an outlet electrode placed in the liquid flow path, an electric pulse being generated for each particle flowing through siad capillary restriction between said two electrodes, the peak value of each electric pulse being substantially proportional to the volume of its associated particle;

generating an output signal, by means of a peak amplitude integration device, which is substantially proportional to the summation value of the peak amplitudes of a predetermined number of evaluated electric pulses; and preventing certain of said electric pulses from being evaluated by said peak value integration device, said certain electric pulses being those which follow a previously generated electric pulse within a time interval lower than a predetermined time interval, or which exceed a predetermined maximum peak amplitude, or which have a pulse width lower than a predetermined minimum pulse width.

* * * * *